United States Patent [19]
Dzieciuch et al.

[11] 3,719,531
[45] March 6, 1973

[54] CATIONICALLY-CONDUCTIVE CERAMICS, THEIR PREPARATION AND USE

[75] Inventors: Matthew A. Dzieciuch, Dearborn Heights; Neill Weber, Dearborn, both of Mich.

[73] Assignee: Ford Motor Company, Dearborn, Mich.

[22] Filed: Dec. 22, 1969

[21] Appl. No.: 886,806

Related U.S. Application Data

[60] Division of Ser. No. 604,100, Nov. 21, 1966, Pat. No. 3,535,163, which is a continuation-in-part of Ser. No. 500,500, Oct. 22, 1965, abandoned.

[52] U.S. Cl. .............136/153, 204/295, 206/65
[51] Int. Cl. ...................H01m 11/00, B01k 3/12
[58] Field of Search............136/153; 206/65; 204/295, 180 P

[56] References Cited

UNITED STATES PATENTS

| | | | |
|---|---|---|---|
| 3,458,356 | 7/1969 | Kummer et al. | 136/153 |
| 3,468,719 | 9/1969 | Tennenhouse | 136/153 |
| 3,404,036 | 10/1968 | Kummer et al. | 136/153 |

Primary Examiner—Donald L. Walton
Attorney—John R. Faulkner and Olin B. Johnson

[57] ABSTRACT

A crystalline article of manufacture consists essentially of a structural lattice and cations which are mobile in relation to the lattice under influence of an electric field. The structural lattice consists essentially of a major proportion by weight of ions of aluminum and oxygen and a minor proportion by weight of ions of metal having a valence not greater than 2 in crystal lattice combination. The cations which are mobile in relation to the crystal lattice are alkali metal cations, preferably sodium ions.

20 Claims, 9 Drawing Figures

MATTHEW A. DZIECIUCH
NEILL WEBER
INVENTORS

BY John R. Faulkner
Olin B. Johnson
ATTORNEYS

CATIONICALLY-CONDUCTIVE CERAMICS, THEIR PREPARATION AND USE

This application is a division of our copending U.S. Pat. application Ser. No. 604,100 filed Nov. 21, 1966, now U.S. Pat. No. 3,535,163, which in turn was a continuation-in-part application of our U.S. patent application Ser. No. 500,500 filed Oct. 22, 1965 with which application Ser. No. 604,100 was copending and which is now abandoned.

This invention relates to novel, cation-conductive, crystalline multi-metal oxides, to objects formed therefrom, their preparation and use. In particular, this invention relates to the use of these crystalline oxides as selective ion conductors. The important utility for these materials is their use as reaction zone separators and solid electrolytes in electrochemical devices and processes, particularly those for generating electrical energy.

The crystalline multi-metal oxides of this invention are useful in a variety of electrochemical cells as solid electrolytes which afford selective cationic conduction between reaction zones and are, for all practical purposes and to all practical degrees, impermeable to the reactants employed when the latter are in compound, elemental, or anionic state.

One such cell is a primary battery wherein electrochemically reactive oxidants and reductants are separated by and in contact with a solid electrolyte consisting essentially of a multi-metal oxide of this invention.

Another of these cells is a secondary battery wherein molten, electrochemically reversibly reactive, oxidants and reductants are separated by and in contact with a solid electrolyte consisting essentially of a multi-metal oxide of this invention.

Another of these cells is a thermo-electric generator wherein a pressure differential is maintained between anodic and cathodic reaction zones and/or between anode and cathode and a molten metal is converted to ionic form, passed through a polycrystalline wall or inorganic membrane consisting essentially of the multi-metal oxide of this invention and reconverted to elemental form.

Another of these cells is a thermally regenerated fuel cell utilizing a solid electrolyte consisting essentially of the multi-metal oxide of this invention.

Still another of these cells is an electrochemical device for separating a liquid metal from a liquid salt thereof by electrofiltering such metal through a polycrystalline membrane consisting essentially of the multi-metal oxide of this invention.

The solid electrolyte half-cell separators of this invention consist essentially of a major proportion by weight of ions of aluminum and oxygen and a minor proportion by weight of metal ions having a valence not greater than 2 in crystal lattice combination and cations which migrate in relation to said crystal lattice under influence of an electric field, i.e. when a difference of electrical potential is provided on opposite sides of said separator. In one preferred embodiment, the metal having a valence not greater than 2 is lithium. In another preferred embodiment, the metal having a valence not greater than 2 is magnesium. In another preferred embodiment, the ions of metal having a valence not greater than 2 are ions of both lithium and magnesium. These separators when carefully prepared are essentially impermeable to helium gas at 25°C.

The use of solid electrolytes in energy conversion devices for the generation of electrical energy is well known in the art. See, for example, Galvanic Cells with Solid Electrolytes Involving Ionic and Electronic Conduction, C. Wagner, Department of Metallurgy, Massachusetts Institute of Technology, pp. 361–377, in International Committee of Electrochemical Thermodynamics and Kinetics, Proceedings of the Seventh Meeting at Lindau 1955, Butterworth Scientific Publications, London, England, 1957, and Solid Electrolyte Fuel Cells, J. Weissbart and R. Ruka, Fuel Cells, G.J. Young Editor, Reinhold Publishing Corporation, New York, New York, 1963. The solid electrolytes of this invention are characterized by high cationic conductivity and high resistance to physical-chemical attack by molten alkali metals and salts thereof.

It is an object of this invention to provide an improved cation-conductive reactant separator for cells employed to generate electrical energy wherein at least one of the cell reactants comprises an alkali metal.

It is another object of this invention to provide an improvement in cells for generating electrical energy comprising a molten alkali metal anode, a cathode, an ionically-conductive cathodic reactant-electrolyte electrochemically reversibly reactive with said alkali metal anode, in contact with said cathode and in ionic communication with said alkali metal through a solid electrolyte by employing as such solid electrolyte a crystalline, multi-metal oxide having in combination a low electrical resistivity and a high resistance to molten alkali metal.

These and other objects and advantages will be apparent from the following detailed description when read in conjunction with the accompanying drawings, wherein.

Figure 7:
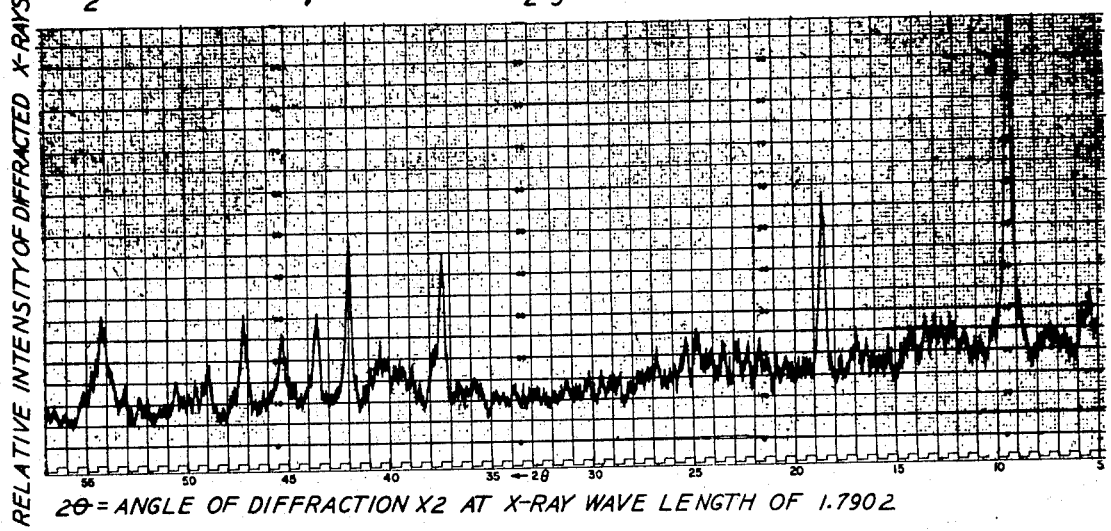
Figure 8:
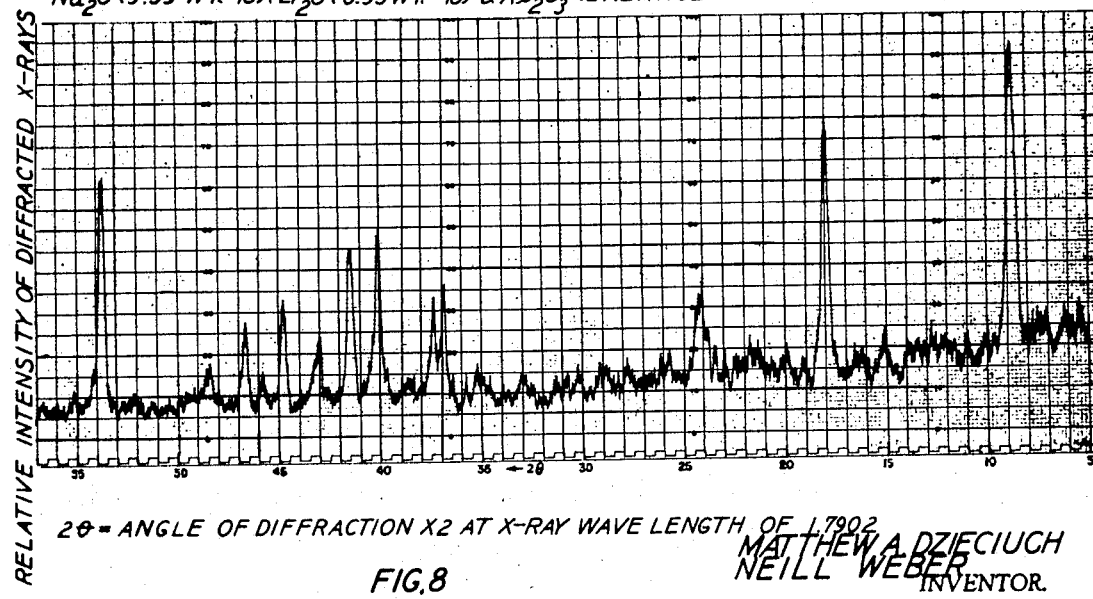
Figure 9:
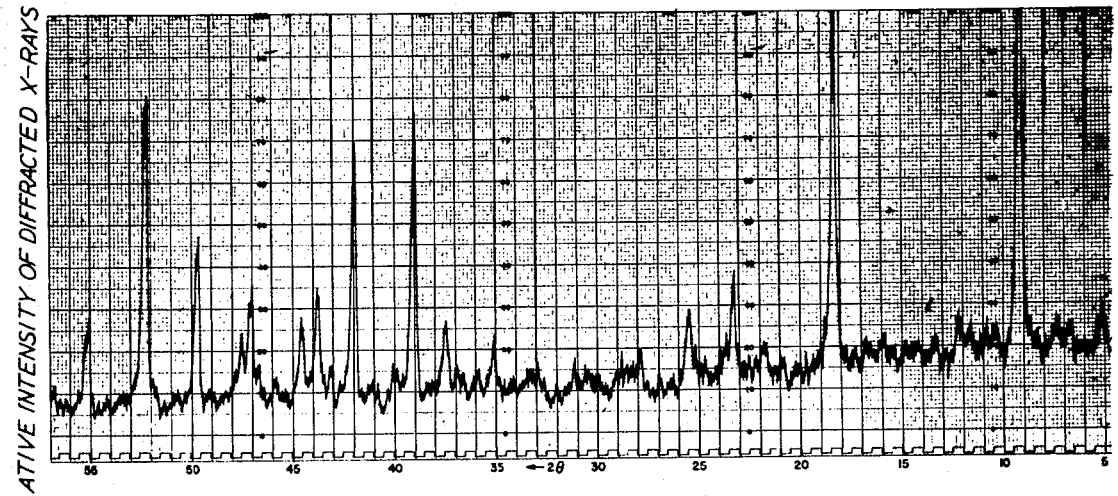

FIGS. 7 and 8 are photographs of recordings which translate into graphic form a defined portion of the X-ray diffraction powder pattern of ionically-conductive, multi-metal oxides of this invention, said pattern being characteristic of the preferred compositions of matter herein; and FIG. 9 is a photograph of a recording which translates into graphic form a defined (corresponding) portion of the X-ray diffraction powder pattern of sodium beta-alumina, conventionally represented as $Na_2O \cdot 11 Al_2O_3$.

The invention will be more fully understood from the following examples.

EXAMPLE 1

Cylindrical pellets were formed from oxides of aluminum, sodium and magnesium in accordance with the following procedure:

1. All starting materials were dried prior to use.
2. In powdered form $Na_2CO_3$, $LiNO_3$, and $Al_2O_3$ were added to a vessel and mechanically mixed for 30 minutes. The $Al_2O_3$ employed was in the form of 0.05 micron particles (Linde B).
3. The mix was heated at 1250°C for 1 hour.
4. The sample was mixed with a wax binder (Carbowax) and mechanically pressed into pellets.
5. The pellets were then isostatically pressed at 90,000 p.s.i.
6. The wax binder was removed by slowly heating the pellets to about 550°C.
7. The pellets were sintered in an electric furnace. During sintering, the pellets were kept in a covered crucible in the presence of packing powder of the same composition as said mix or, in some instances, of $Na_2O \cdot Al_2O_3$.
8. The pellets were weighed and physically measured.
9. The electrical resistivities of the pellets were measured in the following manner:
   a. The flat opposing surfaces of the sample to be measured were first painted with a saturated solution of silver iodide in ethylenediamine. The pellet was then heated to 400°C to remove the ethylenediamine, leaving the silver iodide as a smooth adherent layer. The silver iodide was then covered with silver paint to insure good electrical contact. The resistance was measured at 300°C using 1.5 m.c. alternating current and the resistivity calculated.

The weight percent composition of $Li_2O$, $Na_2O$ and $Al_2O_3$ in these pellets prior to sintering, the sintering time and temperature, the density of the sintered pellets and their specific resistivity are set forth in the following table.

TABLE 1

[Electrical resistivities of polycrystalline multi-metal oxides from $Li_2O$, $Na_2O$ and $Al_2O_3$]

| Batch identification number | Wt. percent individual oxides used in preparation | | | Sintering conditions | | Density (g./cc.) | Specific resistivity (ohm-cm.) 300° C., 1.5 megacycles |
|---|---|---|---|---|---|---|---|
| | $Li_2O$ | $Na_2O$ | $Al_2O_3$ | Time, hours | Temp. (° C.) | | |
| 5636T: | | | | | | | |
| (a) | 0.99 | 9.99 | 89.02 | 16 | 1,440 | 2.86 | 7.17 |
| (b) | | | | 2 | 1,460 | 3.00 | 5.29 |
| (c) | | | | 2 | 1,460 | 2.95 | 6.2 |
| (d) | | | | 3 | 1,460 | 3.00 | 4.92 |
| (e) | | | | 3 | 1,460 | 3.02 | 5.81 |
| (f) | | | | 3 | 1,460 | 3.02 | ¹ 5.10 |
| (g) | | | | 3 | 1,460 | 3.00 | ¹ 3.73 |
| 5637T: | | | | | | | |
| (a) | 1.14 | 9.98 | 88.88 | 16 | 1,440 | 2.92 | 5.32 |
| (b) | | | | 2 | 1,460 | 3.00 | 5.11 |
| (c) | | | | 2 | 1,460 | 3.01 | 4.83 |
| (d) | | | | 17 | 1,460 | 2.81 | 4.99 |
| (e) | | | | 16 | 1,480 | 2.72 | 6.64 |
| (f) | | | | 2 | 1,500 | 2.76 | 7.85 |
| 5647T: | | | | | | | |
| (a) | 2.52 | 9.84 | 87.64 | 2 | 1,400 | 2.67 | 31.66 |
| (b) | | | | 16 | 1,400 | 2.65 | 17.32 |
| (c) | | | | 2 | 1,460 | 2.89 | 14.26 |
| (d) | | | | 2 | 1,500 | 2.41 | 43.7 |
| 5635T: | | | | | | | |
| (a) | 0.83 | 10.00 | 89.17 | 16 | 1,440 | 2.86 | 10.53 |
| (b) | | | | 2 | 1,460 | 2.96 | 8.66 |
| (c) | | | | 2 | 1,500 | 3.05 | 4.88 |
| 5619T: | | | | | | | |
| (a) | 0.66 | 10.02 | 89.32 | 16 | 1,520 | 2.96 | 4.36 |
| (b) | | | | 2 | 1,600 | 2.74 | 8.05 |
| 5629T: | | | | | | | |
| (a) | 1.31 | 9.96 | 88.73 | 18 | 1,420 | 2.80 | 6.53 |
| (b) | | | | 16 | 1,460 | 2.95 | 3.78 |
| (c) | | | | 16 | 1,480 | 2.70 | 8.69 |
| (d) | | | | 4 | 1,500 | 2.70 | 7.48 |
| (e) | | | | 16 | 1,520 | 2.54 | 8.59 |
| (f) | | | | 2 | 1,600 | 2.56 | 11.78 |
| 5633T: | | | | | | | |
| (a) | 1.31 | 10.48 | 88.21 | 18 | 1,420 | 2.78 | 9.19 |
| (b) | | | | 3 | 1,460 | 2.90 | 6.66 |
| (c) | | | | 16 | 1,460 | 2.91 | 5.66 |
| (d) | | | | 4 | 1,500 | 2.72 | 7.43 |
| (e) | | | | 16 | 1,520 | 2.59 | 7.12 |
| (f) | | | | 2 | 1,600 | 2.54 | 10.83 |
| 5648T: | | | | | | | |
| (a) | 3.97 | 9.71 | 86.32 | 16 | 1,440 | 2.51 | 19.6 |
| (b) | | | | 2 | 1,460 | 2.81 | 37.81 |
| (c) | | | | 2 | 1,500 | 2.46 | 31.4 |
| 5653T: | | | | | | | |
| (a) | 0.16 | 10.08 | 89.76 | 3 | 1,460 | 2.86 | 17.2 |
| (b) | | | | 17 | 1,460 | 2.88 | 12.8 |
| 5654T | 0.33 | 10.05 | 89.62 | 3 | 1,460 | 2.84 | 12.4 |
| 5655T | 0.49 | 10.04 | 89.47 | 3 | 1,460 | 2.86 | 12.7 |

¹ After pellet had been immersed in sodium at 800° C. for one week.

EXAMPLE 2

The procedure of Example 1 was repeated except that MgO was substituted for $Li_2O$ (from $LiNO_3$). Data corresponding to that compiled for the pellets of Example 1 is set forth in Table 2.

EXAMPLE 3

The procedure of the preceding examples was repeated except that both MgO and $Li_2O$ (introduced as $LiNO_3$) were used in conjunction with $Na_2O$ (introduced as $Na_2CO_3$) and $Al_2O_3$. Data corresponding to that compiled for the pellets of the preceding examples is set forth in Table 3.

TABLE 2

[Electrical resistivities of polycrystalline multi-metal oxides from MgO, $Na_2O$ and $Al_2O_3$]

| Batch Identification Number | Wt. percent individual oxides used in preparation | | | Sintering conditions | | Density (g./cc.) | Specific resistivity (ohm-cm.) 300° C., 1.5 megacycles |
|---|---|---|---|---|---|---|---|
| | MgO | $Na_2O$ | $Al_2O_3$ | Time, hours | Temp. (° C.) | | |
| 662T: | | | | | | | |
| (a) | 2.5 | 9.0 | 88.5 | 17 | 1,540 | 3.08 | 3.28 |
| (b) | | | | 17 | 1,580 | 3.12 | 3.97 |
| (c) | | | | 17 | 1,580 | 3.16 | 4.12 |
| 5680T: | | | | | | | |
| (a) | 3.92 | 9.75 | 88.33 | 4 | 1,460 | 2.75 | 25.2 |
| (b) | | | | 17 | 1,500 | 2.93 | 6.68 |
| (c) | | | | 3 | 1,560 | 2.97 | 7.82 |
| (d) | | | | 17 | 1,580 | 2.93 | 4.98 |
| 5686T: | | | | | | | |
| (a) | 5.00 | 9.75 | 85.25 | 17 | 1,480 | 2.89 | 18.20 |
| (b) | | | | 16 | 1,520 | 2.94 | 5.70 |
| (c) | | | | 2 | 1,560 | 2.91 | 6.10 |
| (d) | | | | 17 | 1,560 | 2.86 | 13.11 |
| 5688T: | | | | | | | |
| (a) | 3.00 | 9.75 | 87.25 | 17 | 1,480 | 2.92 | 7.48 |
| (b) | | | | 17 | 1,520 | 2.96 | 9.36 |
| (c) | | | | 17 | 1,560 | 2.81 | 14.28 |
| (d) | | | | 3 | 1,600 | 2.89 | 9.12 |
| (e) | | | | 4 | 1,625 | 2.57 | 19.49 |
| 5691T: | | | | | | | |
| (a) | 7.00 | 9.75 | 83.25 | 16 | 1,480 | 1.85 | 99.19 |
| (b) | | | | 3 | 1,520 | 2.73 | 9.52 |
| (c) | | | | 17 | 1,560 | 2.83 | 6.72 |
| (d) | | | | 4 | 1,600 | 2.88 | 12.51 |
| (e) | | | | 16 | 1,600 | 2.83 | 4.57 |
| (f) | | | | 4 | 1,625 | 2.76 | 14.36 |
| 5687T: | | | | | | | |
| (a) | 2.00 | 9.75 | 88.25 | 17 | 1,480 | 2.77 | 10.66 |
| (b) | | | | 17 | 1,520 | 3.00 | 10.65 |
| (c) | | | | 17 | 1,560 | 2.66 | 13.16 |
| (d) | | | | 3 | 1,600 | 2.83 | 13.42 |
| (e) | | | | 4 | 1,625 | 2.49 | 29.08 |
| 5685T: | | | | | | | |
| (a) | 1.00 | 9.75 | 89.25 | 17 | 1,480 | 2.87 | 18.38 |
| (b) | | | | 16 | 1,520 | 2.98 | 16.6 |
| (c) | | | | 2 | 1,560 | 2.84 | 13.88 |
| (d) | | | | 17 | 1,560 | 2.90 | 18.85 |
| 5692T: | | | | | | | |
| (a) | 9.00 | 9.75 | 81.25 | 16 | 1,480 | 1.81 | 122.36 |
| (b) | | | | 3 | 1,520 | 2.63 | 19.94 |
| (c) | | | | 17 | 1,560 | 2.75 | 15.81 |
| (d) | | | | 16 | 1,600 | 2.58 | 17.45 |
| (e) | | | | 4 | 1,625 | 2.48 | 25.17 |
| 56127T: | | | | | | | |
| (a) | 11.0 | 9.75 | 79.25 | 4 | 1,540 | 2.69 | 37.04 |
| (b) | | | | 4 | 1,580 | 2.84 | 21.81 |
| (c) | | | | 4 | 1,625 | 2.71 | 76.32 |
| 56128T: | | | | | | | |
| (a) | 13.00 | 9.75 | 77.25 | 16 | 1,550 | 2.54 | 79.00 |
| (b) | | | | 4 | 1,600 | 2.76 | 45.2 |
| (c) | | | | 2 | 1,650 | 2.68 | 191.00 |
| 56129T: | | | | | | | |
| (a) | 15.00 | 9.75 | 75.25 | 16 | 1,550 | 2.52 | 201.00 |
| (b) | | | | 4 | 1,600 | 2.39 | 60.3 |

TABLE 3

[Electrical resistivities of polycrystalline multi-metal oxides from $Li_2O$, MgO, $Na_2O$ and $Al_2O_3$]

| Batch identification number | Weight percent individual oxides used in preparation | | | | Sintering conditions | | Density (g./cc.) | Specific resistivity (ohm-cm.) 300° C., 1.5 megacycles |
|---|---|---|---|---|---|---|---|---|
| | $Li_2O$ | MgO | $Na_2O$ | $Al_2O_3$ | Time hours | Temp. (° C) | | |
| 5616T: | | | | | | | | |
| (a) | 0.32 | 1.32 | 9.95 | 88.41 | 16 | 1,520 | 2.92 | 8.6 |
| (b) | | | | | 16 | 1,520 | 2.80 | 11.6 |
| (c) | | | | | 5 | 1,580 | 2.93 | 13.4 |
| 5618T: | | | | | | | | |
| (a) | 0.49 | 0.70 | 9.99 | 88.82 | 16 | 1,400 | 2.87 | 10.2 |
| (b) | | | | | 3 | 1,520 | 2.84 | 13.9 |
| (c) | | | | | 16 | 1,520 | 3.07 | 5.58 |
| (d) | | | | | 7 | 1,560 | 2.85 | 7.8 |
| (e) | | | | | 2 | 1,600 | 2.66 | 13.0 |
| 5618(s)T: (a) | 0.49 | 9.87 | 9.97 | 79.67 | 2.25 | 1,520 | 2.50 | [1] 19.9 |
| 5615T: | | | | | | | | |
| (a) | 0.65 | 1.34 | 10.01 | 88.00 | 17 | 1,500 | 2.87 | 24.5 |
| (b) | | | | | 15.5 | 1,520 | 2.74 | 6.57 |
| (c) | | | | | 17 | 1,520 | 2.99 | 5.27 |

[1] After being immersed in sodium at 800° C. for one week.

EXAMPLE 4

The procedure of Example 1 was repeated with the addition of compositional analysis after sintering to ascertain the degree of correlation between prefiring and post-firing compositions. The results of these tests are set forth in the following table:

TABLE 4

Compositional Correlation of Crystalline Products With Reactant Compositions

| Starting materials | | | Firing conditions | | Product % Attributable to individual oxides calculated from quantity of its cation in product | | |
|---|---|---|---|---|---|---|---|
| $Li_2O$ | $Na_2O$ | $Al_2O_3$ | Time, Hr. | Tem. °C | | | |
| 0.99 | 9.99 | balance | 2 | 1460 | 1.00 | 9.62 | balance |
| 1.14 | 9.98 | " | 2 | 1460 | 1.14 | 9.61 | " |
| 2.52 | 9.84 | " | 2 | 1400 | 2.23 | 9.59 | z" |
| 3.97 | 9.11 | " | 2 | 1400 | 3.79 | 9.22 | " |

EXAMPLE 5

Figure 1:
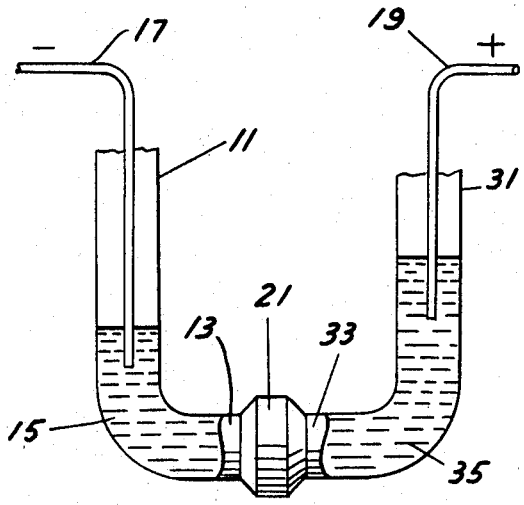
FIG. 1 illustrates the use of an ionically-conductive multi-metal oxide as a separator and solid electrolyte in a simple storage battery cell with a liquid reactant-anode in contact with a first side of said solid electrolyte and a cathode in contact with a liquid reactant-electrolyte which is in contact with said solid electrolyte on the side opposite said first side.

Referring now to FIG. 1, a single cell secondary battery is constructed of glass tubes 11 and 31, a slab 21 of a crystalline multi-metal oxide of this invention separating tubes 11 and 31 and affixed thereto in liquid-tight relationship by glass seals 13 and 33, and conductors 15, 17 and 19. The tubes 11 and 31 have an internal diameter of about 12 mm. These and the glass seals 13 and 33 are constructed of a glass having a coefficient of expansion close to that of the slab, e.g. Corning 7052, Kovar. The tube 11 is partially filled with molten sodium 15 and tube 31 is filled with a molten sodium-and-sulfur-containing reactant such as sodium pentasulfide ($Na_2S_5$) 35. The sodium and $Na_2S_5$ are maintained in molten state by conventional heating means not shown. The air in tubes 11 and 31 may be essentially evacuated and the tubes sealed or the cell may be operated in an inert atmosphere, e.g. argon. The slab 21 is about 12 mm. in diameter and about 2mm. thick with the face exposed to the reactants in each of the tubes 11 and 31 being about 1.13 $cm^2$, assuming a completely flat surface. All other areas hereinafter recited are measured on this basis which may be termed the geometric area.

In this cell the molten sodium serves both as the anodic reactant and as an electrode while the sodium-and-sulfur-reactant serves both as the cathodic reactant and as a liquid electrolyte which is in contact with the electrode 19. Ordinarily one would start the reaction with the cathodic reactant having a sodium to sulfur ratio of about 2:5 and terminate the cell discharge when this ratio is at least about 2:3. A copper wire lead 17 extending into the sodium electrode 15 and a stainless steel electrode 19 extending into the sodium pentasulfide 35 illustrate ends of an external circuit, not further shown, which may include a voltmeter, ammeter, etc. In the discharge half-cycle of this cell, the sodium is attracted to the sulfur opposite the crystalline membrance, gives up an electron, passes through the membrane as a sodium ion and combines with a sulfide ion formed at the cathode 19 with acceptance of an electron, thus causing an electric circuit to flow through the aforementioned external circuit. Recharging is effected by impressing an external source of electric power upon the circuit with a reverse electron flow in relation to that of the discharge half-cycle.

EXAMPLE 6

Figure 2:
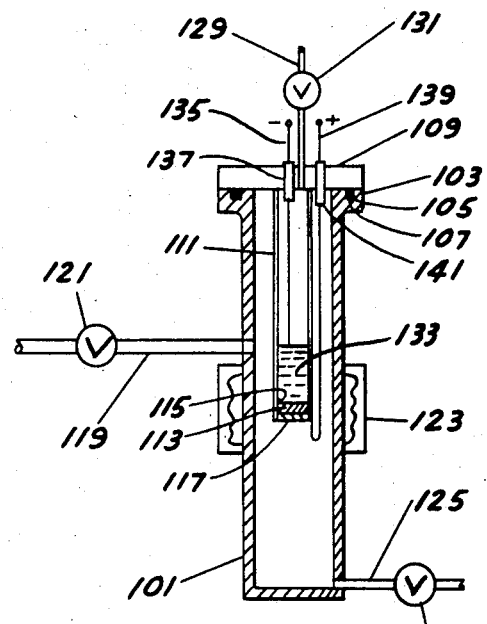
FIG. 2 illustrates the use of an ionically-conductive multi-metal oxide in a primary battery, i.e. a thermoelectric generator wherein heat is converted to electrical energy utilizing a pressure differential between the anodic and cathodic sides of the multi-metal oxide separator.

Referring now to FIG. 2 of the drawing, there is shown a stainless steel vessel 101, e.g. about 1 inch in internal diameter and 11 inches in length. Tube 101 has a flange 103 at its open end. Flange 103 is provided with a groove or channel 105 in which rests a rubber O-ring 107 which provides a vacuum-tight seal when the stainless steel cover plate 109 is secured to tube 101 by thread, bolt or other conventional attaching means, not shown. Positioned inside tube 101 and affixed to cover plate 109 is a smaller tube 111, e.g. about one-half inch in internal diameter and 6 inches in length. The lower end of tube 111 is closed by a circular plate 113 of a crystalline multi-metal oxide of this invention. The vacuum-tight glass seals 115 are provided to secure plate 113 to tube 111 and prevent passage of fluids between plate 113 and tube 111. The lower edge of plate 113 is provided with a thin conducting layer of platinum brite paint 117, e.g. platinum chloride in an organic reducing agent, which in FIG. 2 is shown disproportionally thick in relation to the other components to facilitate its location and identification. In practice this platinum layer is porous enough to permit sodium vapor to pass therethrough and sufficiently thick and continuous to conduct electricity.

Tube 101 is provided with an outlet conduit 119 having a valve 121. A vacuum pump, not shown, is connected to conduit 119 for reducing the pressure in tube 101.

Tube 101 is further provided with a heating element 123 and an outlet conduit 125 with valve 127 for removing liquid from tube 101.

An inlet conduit 129 and valve 131 provides means for introducing a liquid into tube 111.

Tube 111 is partially filled with molten sodium 133. A copper wire negative lead 135 to an external circuit, not shown, extends through an insulator 137 and into the molten sodium 133. Insulator 137 extends through cover 109. A copper wire positive lead 139 to the external circuit passes through an insulator 141 which extends through cover plate 109 and is in electrical connection with the film of platinum 117. In the alternative, lead 135 may be connected directly to tube 111 where tube 111 is a good conductor.

In the operation of this cell, heat is converted directly to electrical energy. Tube 101 is evacuated by pumping means through conduit 121 to a pressure lower than about 0.1 mm. Hg. and then sealed. Sodium 133 in tube 111 is heated to a temperature of 300°C or greater while the lower end of tube 101 is maintained at approximately 100°C by the ambient room temperature. A difference in sodium vapor pressure on the two sides of the plate 113 results in the creation of a difference of electrical potential across the plate. As electrons flow through the external circuit, sodium 133 passes through plate 113 as sodium ions accepting an electron from the platinum electrode 117 and returning to elemental state.

Since the lower part of tube 101 is maintained at the relatively low temperature of about 100°C, the sodium condenses here and the pressure in the outer tube 101 becomes the vapor pressure of sodium at about 100°C modified by any pressure drop produced by the mass flow of sodium vapor from the platinum 117 to the cooler walls of the outer tube 101.

One advantage of this thermo-electric generator is that the hot and cold parts can be separated to almost arbitrary distances thereby minimizing the effects of wasted heat conduction between the hot and cold parts. In continuous operation, the condensed sodium in the bottom of tube 101 is heated and returned to the hot zone in tube 111.

EXAMPLE 7

Figure 3:
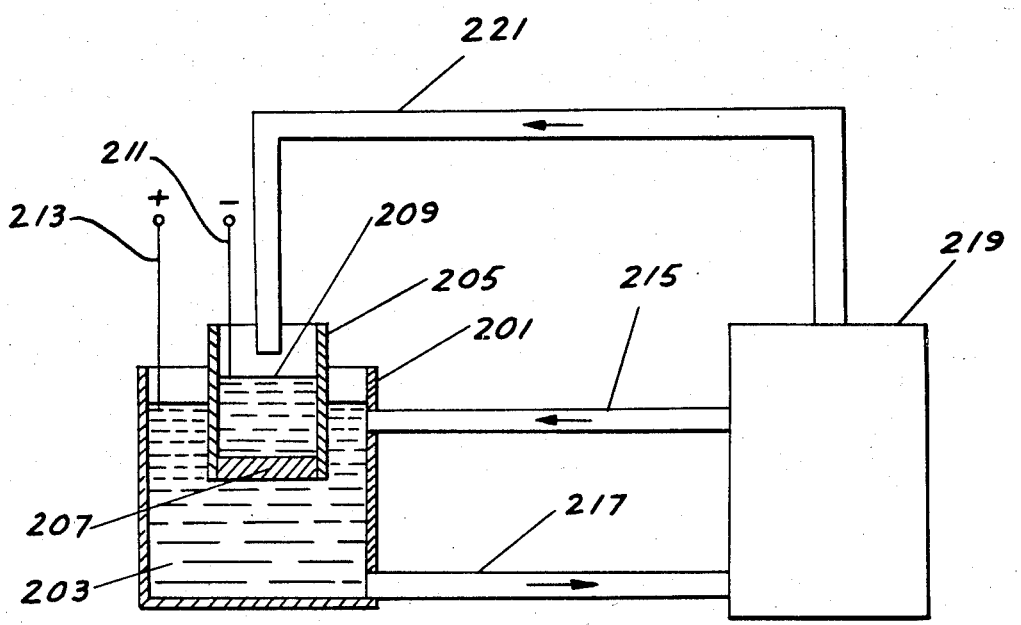
FIG. 3 illustrates the use of an ionically-conductive multi-metal oxide in another embodiment of a primary battery, i.e. a thermally regenerated fuel cell.

Referring now to FIG. 3, there is shown in sectional view, a vessel 201 containing molten tin 203. Extending into the molten tin 203 is a smaller vessel 205, also shown in sectional view, with the lower end closed with a plate 207, a crystalline multi-metal oxide of this invention and a glass seal, not shown. In operation, vessels 201 and 205 are closed at their upper ends and/or blanketed with an inert gas. Vessel 205 contains molten sodium 209. Conductor 211 is a negative lead to an external circuit, not further shown, and extends into the molten sodium while a positive lead, conductor 113, extends into the molten tin.

Vessel 201 is in fluid communication with a decomposition chamber 219 via an upper conduit 215 and a lower conduit 217. Decomposition chamber 219 is in fluid communication with vessel 205 via overhead circuit 221 and is provided with heating means, not shown.

This device converts heat into electrical energy. The sodium ions in plate 207 are attracted to the molten tin in vessel 201 and the contents of this vessel are then represented by the formula $NaSn_x$. Sodium 209 releases electrons to lead 211 and the resultant sodium ions replace the sodium ions attracted from plate 207 to the tin 203. Such electrons are returned via the external circuit and lead 213 to be accepted in the formation of $NaSn_x$ in vessel 201. The reaction product $NaSn_x$ passes via conduit 217 to decomposition chamber 219 and is heated to decomposition temperature. Sodium vapor passes overhead from decomposition chamber 219 to vessel 205 via conduit 221 while molten tin is returned to vessel 201 via conduit 215.

EXAMPLE 8

Crystalline cylinders measuring about 1 cm. in length and about 1.2 cm. in diameter were prepared in the following manner:

1. Magnesium oxide is prepared by calcining basic magnesium carbonate at a temperature of about 816°C.
2. The magnesium oxide is mixed with finely divided (Linde B) $Al_2O_3$ as a benzene slurry.
3. The benzene is removed by evaporation.
4. The magnesium oxide-alumina mixture is then fired at about 1427°C for about 30 minutes.
5. The product of 4 is mixed with sodium carbonate as a benzene slurry.
6. The benzene is removed by evaporation.
7. The magnesium oxide-alumina-sodium carbonate mixture is then fired at about 1427°C for about 30 minutes.
8. The powder product of (7) the particles of which are less than about 1, preferably not significantly greater than one-third, micron, is then admixed with a conventional wax lubricant (Carbowax) and pressed into cylinders hydrostatically at 100,000 p.s.i.
9. The wax lubricant is removed by heating the cylinders in air raising the temperature over a 2-hour period to about 600°C and maintaining such temperature for an additional hour.
10. The cylinders are then sintered by packing the cylinders in MgO crucibles with packing powder of the same composition, i.e. the powder product of (7), and heating at 1900°C in air for 15 minutes.

The composition of these cylinders is determined to be 6.3 weight percent $Na_2O$, 2.18 weight percent $MgO$ and 91.52 weight percent $Al_2O_3$. The composition is determined by conventional chemical analysis, i.e. sodium by flame photometry, magnesium by titration using eirochrome black T as the indicator, and aluminum by difference.

Figure 4:
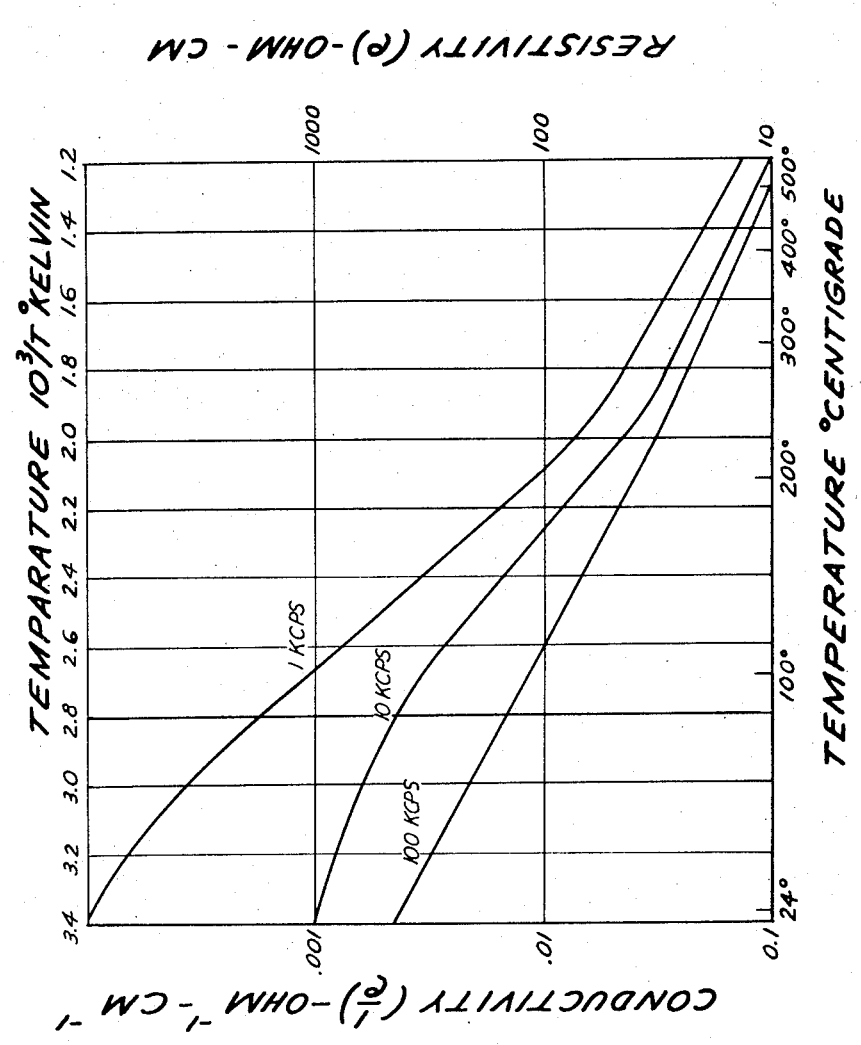
FIG. 4 is a graphic illustration of the electrical resistivity properties of a multi-metal oxide prepared in accordance with a preferred embodiment of this invention as a function of temperature.

Resistivity measurements as a function of temperature over a range from room temperature to 500°C were made using one of these cylinders in a argon atmosphere. The results are illustrated graphically in FIG. 4 of the drawings. The weight of this cylinder was 3.16 grams.

Figure 5:
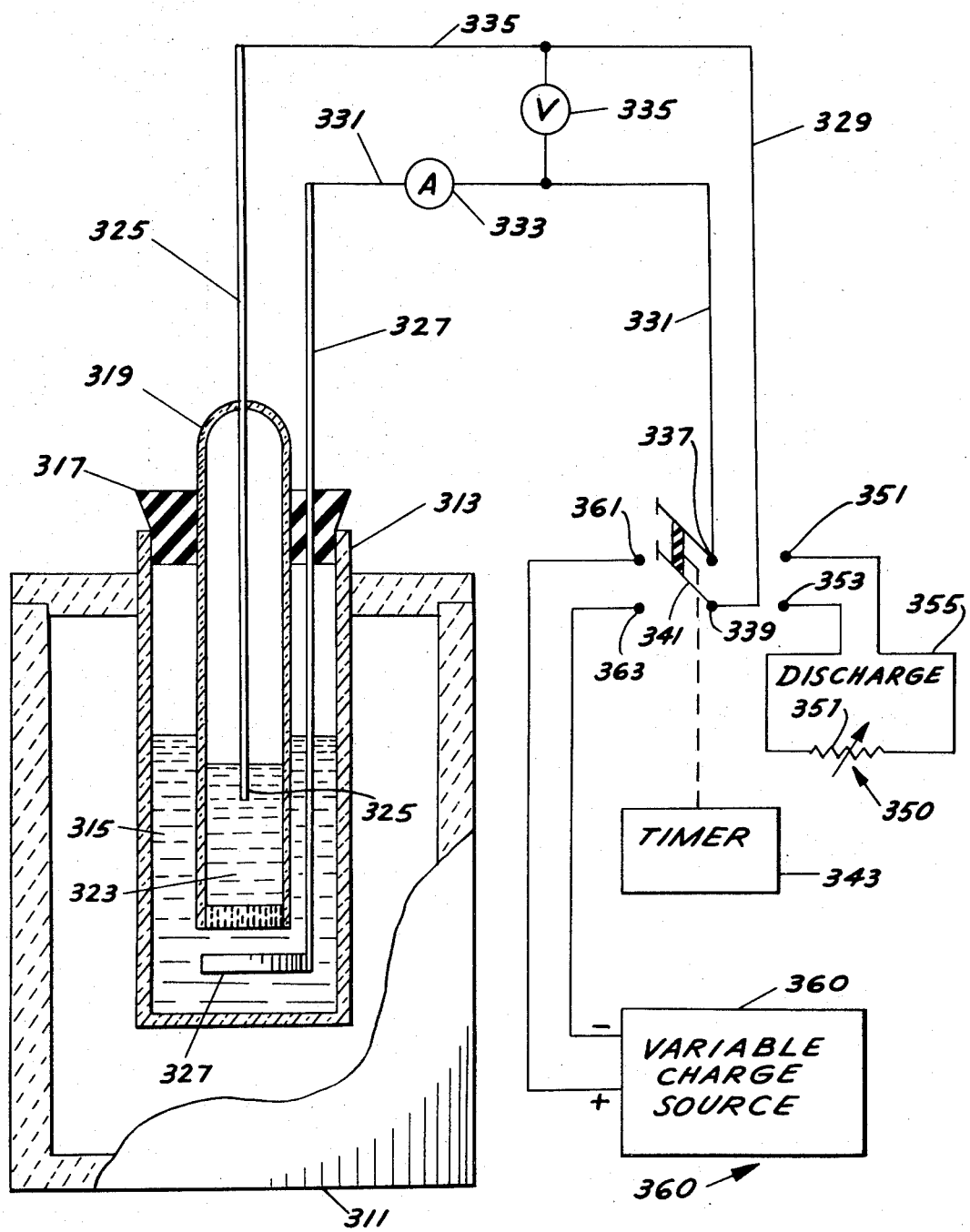
FIG. 5 illustrates a test cell with discharge and charge circuits employed to demonstrate change of cell resistance with time while employing a multi-metal crystalline oxide of this invention as a half-cell separator.

Referring now to FIG. 5, a test cell was constructed using as the anode container a glass tube 313 mounted in a heated well 311. A supply of liquid sodium pentasulfide 315 is shown in the bottom of tube 313. Closing the upper end of tube 313 is a rubber stopper 317 through which is inserted a smaller glass tube 319. The lower end of tube 319 is sealed to and closed by a disc 321 cut from the cylinder tested for resistivity, FIG. 4. A supply of liquid sodium 323 is shown in the bottom of tube 319. A tungsten wire 325 is shown extending through the top of tube 319 into the liquid sodium 323. The top of tube 319 is sealed about wire 325. Also extending through stopper 317 is a michrome ribbon electrode 327 which extends into the liquid sodium pentasulfide 315 to a position immediately below disc 321 where it terminates in a loose coil.

Nichrome is an alloy containing about 58.5 weight percent Ni, about 22.5 weight Fe, about 16 weight percent Cr and about 3 weight percent Mn.

Electrically connected to wire 325 is a conductor 329. Ribbon electrode 327 is electrically connected to a conductor 331. Electrically connected with conductor 331 is an ammeter 333. Between and in electrical connection with conductors 329 and 331 is a voltmeter 335.

In electrical connection with the terminals 337 and 339 of conductors 329 and 331, respectively, is a pivotable switch means 341. Switch 341 can be periodically pivoted by timer 343 to replace conductors 329 and 331 into electrical connection with terminals 351 and 353 of a discharge circuit 350 which includes conductor 355 and variable resistor 357 thereby completing a cell circuit and initiating the discharge of the cell wherein sodium ions are transferred from inside tube 319 into the $Na_2S_5$ in tube 313. Switch 341 may also be pivoted by timer 343 to place conductors 329 and 331 in electrical connection with terminals 361 and 363 of a charge circuit 360 comprising a conductor 365 and a battery assembly 367 the power output of which can be varied. The latter connection initiates a charging cycle whereby sodium from the chamber initially containing $Na_2S_5$ is passed through disc 321 into tube 319. By controlling the electrical input, i.e. charge voltage, of the recharging operation and the load resistor during the discharge operation, the cell was operated so that the difference between the charge drawn from the cell and the charge delivered to the cell was zero over a complete cycle.

The open circuit potential of this cell measured 2 volts. The cell was alternately charged and discharged at 30-minute intervals. The charge-discharge current was maintained at about 10 milliamperes.

Two such cells, hereinafter referred to as Cell A and Cell B, were operated with the anodic and cathodic reactants maintained at a temperature of 300° ± 1°C. A control cell, hereinafter referred to as Cell C, was operated with such reactants maintained at 296° ± 1°C. The control cell otherwise differed from Cells A and B only with respect to disc 321 which was prepared in the following manner.

1. A mixture of sodium carbonate and $Al_2O_3$ in relative concentrations corresponding to the eutectic mixture of beta-alumina and sodium aluminate which melts at about 2900°F was milled in a ball mill for 2 days and then acid leached with dilute solutions of $HNO_3$ and HCl to remove sodium aluminate and iron traces from milling. Beta-alumina is conventionally represented by the formula $Na_2O \cdot 11 Al_2O_3$. Sodium aluminate is conventionally represented by the formula $Na_2O \cdot Al_2O_3$.

2. A wax lubricant (Carbowax) was mixed with the powder and this mixture was pressed into cylinders hydrostatically at 100,000 p.s.i.

3. The wax lubricant was removed by heating the cylinders in air raising the temperature over a 2-hour period to 600°C and maintaining such temperatures for an additional hour.

4. The pressed cylinders were fired at about 1816°C in a carbon tube furnace under an argon atmosphere. The cylinders were surrounded with coarse particles (60 mesh) beta-alumina to prevent loss of soda. The fired samples were chemically analyzed by the same methods disclosed earlier in this example and found to contain 5.75 weight percent $Na_2O$ and 94.25 weight percent $Al_2O_3$. A cylindrical disc cut from one of these cylinders with a diamond saw was used in the control cell.

The disc used in Cell C, the control cell, measured 2.8 mm. in thickness and had a surface area exposed to the anodic reactant of 1.29 cm². The cylindrical disc used in Cell A measured 3.28 mm. in thickness and had a surface area exposed to the anodic reactant of 1.16 cm². The cylindrical disc used in Cell B measured 2.17 mm. in thickness and had a surface area exposed to the anodic reactant of 1.10 cm².

As the crystalline disc 321 for the three test cells varies in exposure area, the change of cell resistance data is brought into direct comparison through use of an $A(R-R_o)$ factor in the following table wherein the following legend is employed:

R = cell resistance-ohms
$R_o$ = initial cell resistance-ohms
$t$ = time in days
A = surface area of ion-conducting disc 321 exposed to anodic reactant, cm²

TABLE 5

Cell Resistance and Change of Same with Time

| | Cell A | | | Cell B | | | Cell C | |
|---|---|---|---|---|---|---|---|---|
| t | R | $A(R-R_o)$ | t | R | $A(R-R_o)$ | t | R | $A(R-R_o)$ |
| 7 | 6.96 | 0 | 1 | 5.70 | 0 | 0 | 8.47 | 0 |
| 10 | 6.88 | −0.0975 | 2 | 5.725 | +0.028 | .97 | 9.29 | +1.06 |
| 12 | 6.87 | −0.109 | 3 | 5.66 | −0.044 | 1.95 | 10.24 | +2.28 |
| 14 | 6.84 | −0.147 | 6 | 5.64 | −0.066 | 4.68 | 12.53 | +5.24 |
| 18 | 6.85 | −0.133 | 8 | 5.62 | −0.088 | 5.96 | 13.80 | +6.88 |
| 21 | 6.78 | −0.219 | 10 | 5.63 | −0.077 | 7.90 | 14.51 | +7.79 |
| 24 | 6.83 | −0.158 | 14 | 5.71 | +0.011 | 8.75 | 15.06 | +8.50 |
| 26 | 6.91 | −0.061 | 17 | 5.50 | −0.22 | 9.89 | 15.97 | +9.68 |
| 28 | 6.86 | −0.121 | 20 | 5.62 | −0.088 | 10.81 | 16.03 | +9.75 |
| 31 | 6.97 | −0.024 | 22 | 5.6 | −0.044 | 11.80 | 16.52 | +10.38 |
| 33 | 6.93 | −0.037 | 24 | 5.65 | −0.055 | 12.85 | 16.80 | +10.75 |
| 35 | 6.97 | +0.012 | 27 | 5.59 | −0.12 | 13.95 | 17.65 | +11.84 |
| 39 | 6.98 | +0.024 | | | | 14.78 | 17.67 | +11.87 |
| 45 | 7.03 | +0.086 | | | | 16.05 | 17.62 | +11.80 |
| 47 | 7.09 | +0.158 | | | | 18.70 | 18.11 | +12.44 |
| 49 | 7.14 | +0.219 | | | | 19.80 | 18.12 | +12.45 |
| 52 | 7.18 | +0.268 | | | | 20.95 | 17.61 | +11.79 |
| 54 | 7.21 | +0.305 | | | | 21.90 | 17.96 | +12.24 |
| 56 | 7.07 | +0.130 | | | | 23.0 | 17.74 | +11.96 |
| 59 | 7.11 | +0.182 | | | | | | |
| 61 | 7.20 | +0.293 | | | | | | |
| 63 | 7.22 | +0.316 | | | | | | |
| 66 | 7.31 | +0.426 | | | | | | |
| 68 | 7.28 | +0.389 | | | | | | |
| 70 | 7.36 | +0.486 | | | | | | |
| 73 | 7.40 | +0.535 | | | | | | |

Figure 6:
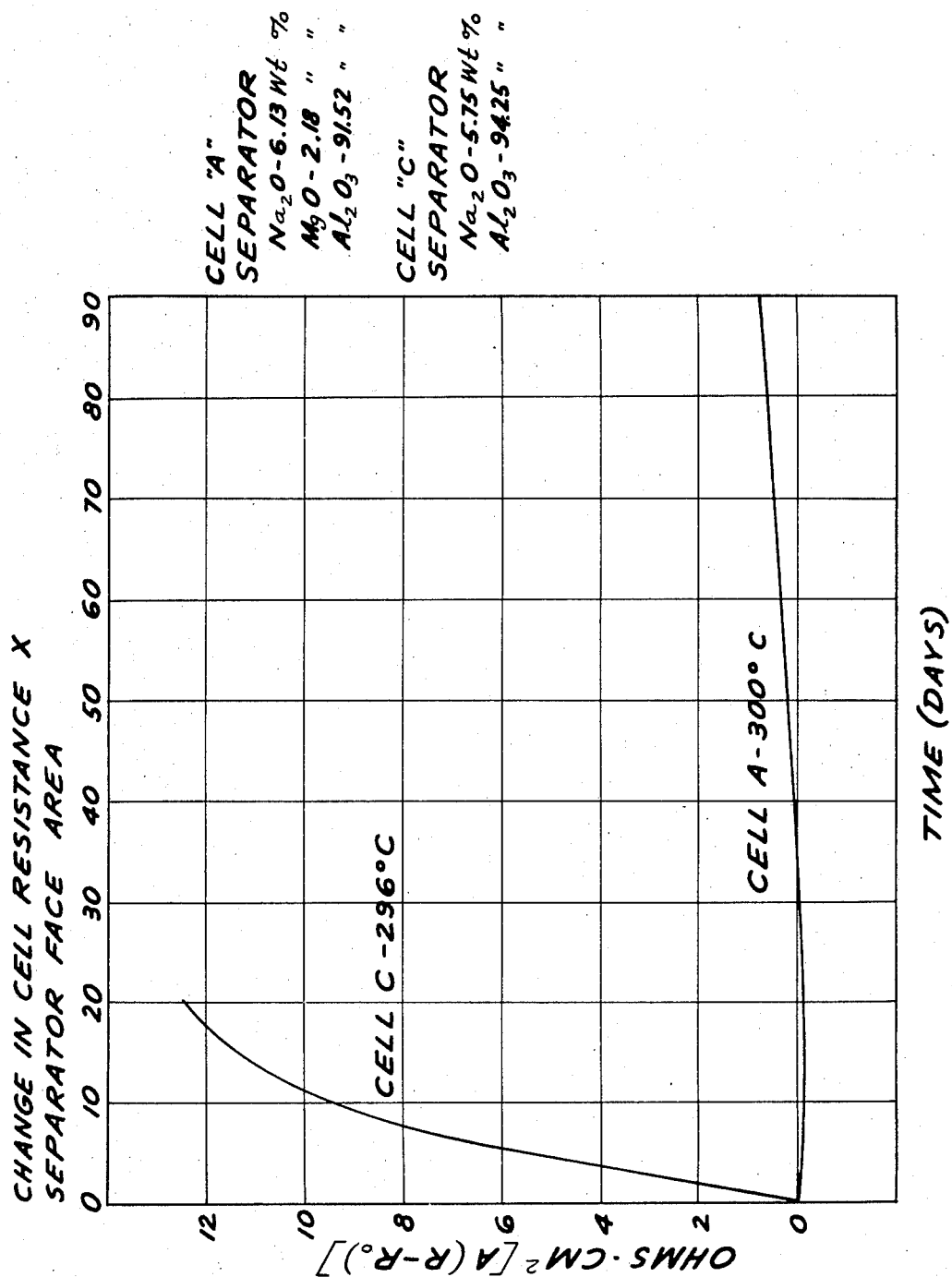
FIG. 6 illustrates graphically changes in cell resistance with time using a multi-metal oxide of this invention and a control.

The foregoing changes in total cell resistance in Cells A and C with time are illustrated graphically in FIG. 6 of the drawings.

EXAMPLE 9

Crystalline cylinders, about 1 x about 1.2 cm., were prepared in accordance with the first method set forth in Example 8, i.e. the preparation of the $Na_2O$ — MgO — $Al_2O_3$ cylinders.

The (D.C.) electrical resistivity of each cylinder was determined in air at room temperature, i.e. 20–25°C. In this determination, the cylinder being tested was sandwiched between filter papers saturated with sodium hydroxide solution (5 normal). The opposite sides of the sandwich were each in contact with Ag/AgO electrodes electrically connected with an ohmmeter.

Properties of these cylinders are set forth in the following table.

TABLE 6

Electrical Resistivities of $Na_2O$ — MgO — $Al_2O_3$ Cylinders

| Batch Identification No. | Wt. Percent Batch Composition | Cylinder No. | Electrical Resistivity (ohm-cm) | Wt. of Cylinder gms |
|---|---|---|---|---|
| 126 | MgO—2.33 | 1 | 348 | 2.86 |
| | | 2 | 292 | 2.79 |
| | $Na_2O$—7.13 | 3 | 220 | 2.93 |
| | | 4 | 278 | 2.78 |
| | $Al_2O_3$—90.54 | 5 | 342 | 2.91 |
| | | 6 | 294 | 2.86 |
| | | 7 | 330 | 2.82 |
| | | 8 | 230 | 2.91 |
| | | 9 | 275 | 2.82 |
| | | 10 | 294 | 2.90 |
| | | 11 | 256 | 2.79 |
| | | 12 | 296 | 2.82 |
| | | Average | 289.58 | |

| Batch | Composition | Cyl. No. | Resistance | Wt. | Avg |
|---|---|---|---|---|---|
| 123 | MgO—2.02 | 1 | 308 | 3.0 | |
| | | 2 | 320 | 2.78 | |
| | Na₂O—8.14 | 3 | 335 | 2.98 | |
| | | 4 | 340 | 3.02 | |
| | Al₂O₃—89.84 | 5 | 400 | 2.93 | |
| | | 6 | 355 | 3.0 | |
| | | 7 | 325 | 2.88 | |
| | | 8 | 325 | 2.88 | |
| | | 9 | 310 | 3.06 | |
| | | Average | | | 335.62 |
| 124 | MgO—1.72 | 1 | 378 | 3.05 | |
| | | 2 | 407 | 2.99 | |
| | Na₂O—8.24 | 3 | 354 | 2.95 | |
| | | 4 | 420 | 3.01 | |
| | Al₂O₃—90.04 | 5 | 322 | 3.05 | |
| | | 6 | 346 | 3.06 | |
| | | 7 | 372 | 3.01 | |
| | | 8 | 352 | 3.03 | |
| | | Average | | | 368.87 |
| 120 | MgO—2.81 | 1 | 425 | 2.91 | |
| | | 2 | 530 | 2.90 | |
| | Na₂O—8.13 | 3 | 550 | 2.93 | |
| | | 4 | 540 | 2.90 | |
| | Al₂O₃—89.06 | | | | |
| | | Average | | | 511.25 |
| 111 | Mgo—3.34 | 1 | 654 | 2.88 | |
| | | 2 | 654 | 2.80 | |
| | Na₂O—10.31 | 3 | 896 | 2.80 | |
| | | 4 | 764 | 2.80 | |
| | Al₂O₃—86.35 | 5 | 957 | 2.81 | |
| | | 6 | 757 | 2.90 | |
| | | Average | | | 930.33 |
| 119 | Mgo—1.51 | 1 | 1040 | 3.12 | |
| | | 2 | 1020 | 3.13 | |
| | Na₂O—7.19 | 3 | 840 | 3.12 | |
| | | 4 | 1420 | 3.11 | |
| | Al₂O₃—91.30 | | | | |
| | | Average | | | 1080 |
| 117 | MgO—0.93 | 1 | 3020 | 3.02 | |
| | | 2 | 2200 | 3.0 | |
| | Na₂O—7.47 | 3 | 2900 | 3.01 | |
| | | 4 | 2100 | 2.9 | |
| | Al₂O₃—91.60 | | | | |
| | | Average | | | 2555 |
| 91-N | MgO—2.66 Na₂O—7.38 Al₂O₃—89.96 | 1 | 264 | 2.73 | |
| 104 | MgO—2.78 | 1 | 282 | 3.04 | |
| | | 2 | 340 | 3.02 | |
| | Na₂O—8.81 | 3 | 380 | 3.12 | |
| | Al₂O₃—88.41 | Average | | | 334 |
| 118 | MgO—0.62 | 1 | 1280 | 3.04 | |
| | | 2 | 1240 | 3.05 | |
| | Na₂O—7.42 | 3 | 1210 | 3.04 | |
| | Al₂O₃—91.96 | Average | | | 1263 |

EXAMPLE 10

Cylinders were prepared in accordance with the first method set forth in Example 8 except that $Li_2O$ was employed in lieu of MgO and different sintering temperatures were used.

The (D.C.) electrical resistance of each of these cylinders was determined as in Example 9.

The composition of each batch of these materials was determined by chemical analysis after the last step prior to sintering. This composition, the electrical resistance, and weight of the individual cylinders and sintering temperatures for the respective batches are set forth in the following table.

TABLE 7

Electrical Resistivities of $Na_2O—Li_2O—Al_2O_3$ Cylinders

| Batch Identification | Wt. Percent Batch Composition | Cylinder No. | Electrical Resistivity (ohm-cm) | Wt. of Cylinder gms | Sintering Temp. C° |
|---|---|---|---|---|---|
| 85 | Na₂O - 8.62 | 1 | 7450 | 2.58 | 1720 |
| | | 2 | 5100 | 2.75 | 1720 |
| | Li₂O - 0.83 | 3 | 6200 | 2.68 | 1720 |
| | | 4 | 8590 | 2.48 | 1850 |
| | Al₂O₃- 90.55 | 5 | 2670 | 2.88 | 1850 |
| | | 6 | 2100 | 3.01 | 1850 |
| 89 | Na₂O - 9.0 | 1 | 1950 | 2.76 | 1900 |
| | | 2 | 3550 | 2.72 | 1900 |
| | Li₂O - 0.7 | 3 | 4600 | 2.48 | 1900 |
| | | 4 | 3200 | 2.74 | 1900 |
| | Al₂O₃ -90.3 | 5 | 2200 | 2.82 | 1900 |
| | | 6 | 2500 | 2.81 | 1900 |
| 90 | Na₂O -11.87 | 1 | 34,000 | 2.84 | 1700 |
| | | 2 | 14,000 | 2.83 | 1700 |
| | Li₂O - 1.64 | 3 | 22,200 | 2.68 | 1700 |
| | | 4 | 26,700 | 2,62 | 1700 |
| | Al₂O₃ -86.49 | | | | |

EXAMPLE 11

Cylinders were prepared in accordance with the first method set forth in Example 8 except that NiO, ZnO, and CoO were employed in lieu of MgO and different sintering temperatures were used.

The (D.C.) electrical resistance of each of these cylinders was determined as in Example 5.

The composition of each batch of these materials was determined by chemical analysis after the last step prior to sintering. This composition, the electrical resistance and weight of the individual cylinders, and the sintering temperatures used for the respective batches are set forth in the following table.

TABLE 8

Electrical Resistivities of $Na_2O—NiO—Al_2O_3$, $Na_2O - ZnO - Al_2O_3$, and $Na_2O—CoO—Al_2O_3$ Cylinders

| Batch Identification No. | Wt. Percent Batch Composition | Cylinder No. | Electrical Resistivity (ohm-cm) | Wt. of Cylinder gms | Sintering Temp. C° |
|---|---|---|---|---|---|
| 95-2 | Na₂O—8.65 | 1 | 1665 | 3.18 | 1800 |
| | | 2 | 1850 | 3.14 | 1800 |
| | NiO—6.66 Al₂O₃—84.69 | | | | |
| 113 | Na₂O—8.65 | 1 | 1070 | 2.89 | 1900 |
| | | 2 | 1700 | 2.90 | 1900 |
| | NiO—6.66 | 3 | 995 | 2.93 | 1900 |
| | Al₂O₃— 84.69 | | | | |
| 95-1 | Na₂O—8.70 | 1 | 1370 | 3.12 | 1800 |
| | | 2 | 2350 | 3.02 | 1800 |
| | ZnO—5.86 Al₂O₃—85.44 | | | | |
| 95 | Na₂O—8.64 | 1 | 1035 | 3.21 | 1800 |
| | | 2 | 945 | 3.20 | 1800 |
| | CoO—6.67 Al₂O₃—84.69 | | | | |

EXAMPLE 12

Crystalline cylinders measuring about 1 cm in length and about 1.2 cm in diameter were prepared in accordance with the first method described in Example 8 except that the relative amounts of the ingredients were changed as hereinafter set forth. Where sintering temperatures were different this is also indicated.

Cylinders were prepared in such manner from ingredients which measured immediately prior to sintering as follows:

$Na_2O$ — 7.93 wt. %
MgO — 3.44 wt. %
$Al_2O_3$ — 88.63 wt. %

The cylinders were sintered at about 1850°C for 30 minutes. Representative cylinders were then subjected to chemical analysis and the sintered composition was determined to be as follows:

$Na_2O$ — 7.71 wt. %
$MgO$ — 3.81 wt %
$Al_2O_3$ — 89.42 wt. %

Electrical resistivity (D.C.) measurements were made of these cylinders as in the previous examples. These fell within a range of about 318 to about 500 ohm-cm.

Another group of cylinders were formed in like manner except as to relative amounts of ingredients. Chemical analysis of representative cylinders after sintering disclosed that these cylinders contained about 3.94 wt. percent MgO, 8.49 wt. percent $Na_2O$ and a balance of $Al_2O_3$. Eleven of these cylinders were stacked vertically for sintering with the hottest point in the furnace in the area of the cylinder No. 4. The temperature at this point was 1900°C. The weights and electrical resistivities measured for these cylinders are set forth below.

| Cylinder No. | Wt., gms | Electrical Resistivity (ohm-cm) |
| --- | --- | --- |
| 1 | 3.03 | 468 |
| 2 | 2.91 | 317 |
| 3 | 2.91 | 284 |
| 4 | 2.98 | 190 |
| 5 | 2.94 | 475 |
| 6 | 3.02 | 604 |
| 7 | 3.96 | 510 |
| 8 | 2.98 | 695 |
| 9 | 2.93 | 640 |
| 10 | 3.02 | 595 |
| 11 | 2.83 | 730 |

Another group of cylinders were produced in like manner, die pressed at 4,000 p.s.i. and hydrostatically pressed at 110,000 p.s.i. Representative samples were analyzed with the following results:

$Na_2O$ — 7.77 wt. %
$MgO$ — 3.81 wt. %
$Al_2O_3$ — remainder

These cylinders were fired at 1950°C and tested for electrical resistivity (D.C.) as in the preceding examples. The determinations made are set forth below.

| Cylinder No. | Electrical Resistivity (ohm-cm) |
| --- | --- |
| 1 | 470 |
| 2 | 318 |
| 3 | 370 |
| 4 | 338 |
| 5 | 430 |
| 6 | 500 |

The crystalline structure of representative cylinders of aluminum oxide-sodium oxide-magnesium oxide from Example 12 and the crystalline oxides of Examples 1–4 were subjected to X-ray diffraction analysis and an X-ray diffraction powder pattern corresponding to the pattern graphically illustrated in FIG. 7 was repeatedly obtained.

The crystalline structure of representative cylinders of aluminum oxide-sodium oxide-magnesium oxide from Example 4 reveal an X-ray diffraction pattern that is quite different. This pattern is of the type obtained from $Na_2O \cdot 11 Al_2O_3$.

EXAMPLE 13

Plates of the tri-metal oxides prepared in accordance with the procedure of Example 8 of this invention are further used to produce elemental metal of exceedingly high purity from an ionizable compound of the metal sought to be recovered. In this use the plate serves as an ion filter through which an impressed voltage and resultant current flow drives the ion to be recovered as elemental metal.

Using a cell such as that shown in FIG. 1, a molten $NaNO_3$ — $NaNO_2$ eutectic mixture at 245°C is placed in the tube corresponding to 31 of FIG. 1. The plate or slab corresponding to 21 of FIG. 1 serves as the ion-filtering device. A small amount of molten sodium is placed in the tube corresponding to 11 of FIG. 1 and a direct current from a direct electric current power source connected with the external circuit is passed through the cell via leads corresponding to 17 and 19 of FIG. 1. The impressed potential is controlled so as to make lead 17 more negative than the open circuit voltage of the cell. Sodium ions leave the mixture, pass through the plate and elemental sodium is recovered.

EXAMPLE 14

An ionically-conductive multi-metal polycrystalline oxide having potassium ion substituted for sodium ion was prepared in the following manner:

A mixture containing 9.75 weight percent $Na_2O$ as $Na_2CO_3$, 3.92 weight percent MgO, and 86.33 weight percent $Al_2O_3$ was shaken mechanically for 30 minutes, heated at 1250°C for 1 hour, mixed with wax, then mechanically pressed into pellets. The pellets were isostatically pressed at 90,000 p.s.i. after which the binder was removed by slow heating to 550°C. The pellets were then sintered in an electric furnace, i.e. heated at about 1550°C. During sintering, the samples were kept in a covered crucible with $Na_2O \cdot Al_2O_3$ packing powder.

A sample pellet was placed in a clean crucible. This was placed open on a bed of dry $K_2O \cdot Al_2O_3$ in a larger crucible. The larger crucible was covered and heated to 1380°C for 64 hours to expose the sample to $K_2O$ vapor resulting from slow decomposition of the $K_2O \cdot Al_2O_3$. After cooling, the sample was washed in water and dried.

The electrical resistivity of the sample was measured by the method used in Example 1 and its density was measured. This sample exhibited a density of 2.92 and an electrical resistivity at 300°C of 22.1 ohm-cm.

The electrodes used to measure resistivity were removed from the sample and the sample was crushed and examined for composition. An X-ray diffraction pattern obtained using a cobalt tube (wave length about 1.7902 A) revealed that the compound was characterized by a peak at 53.5° – 54.5° as opposed to the pattern which is obtained from $Na_2O \cdot 11 Al_2O_3$ which is characterized by peaks at 52° – 53° and at 55° – 56° and an absence of a peak at 54°. Both compounds have several peaks in common. The pattern obtained for the sample duplicates the pattern obtained for the sodium-containing multi-metal oxides prepared in Examples 1–4.

Elemental analysis of the sample revealed that about 1.14 weight percent thereof was derived from $Na_2O$ and about 11.80 weight percent from $K_2O$.

Another of the pellets was placed in an open clean platinum crucible. This crucible was placed on a bed of dry KCl in a larger platinum crucible. The larger crucible was covered and heated at 1100°C for 3 hours. This pellet was then placed in molten $KNO_3$ at 400°C for 16 hours and then reheated in KCl vapor at 1100°C for 3 hours. The sample was washed with cold water and dried. The sample was tested in the same manner as the preceding sample. This sample had a density of 2.75 and an electrical resistivity at 300°C of about 8.26 ohm-cm. Elemental analysis of this sample revealed that about 0.66 weight percent thereof was derived from $Na_2O$ and about 12.76 weight percent from $K_2O$.

Another of the pellets is converted to a lithium ion-conducting ceramic by immersing the pellet overnight in liquid silver nitrate under an argon blanket and then immersing the resultant pellet overnight in liquid lithium chloride under an argon blanket.

For a discussion of conventional X-ray diffraction composition characterization techniques, see "Elements of X-Ray Diffraction" by B. D. Cullity, Addison-Wesley Publishing Co., Inc., Reading, Mass., 1956, Library of Congress Catalog No. 56-10137, particularly "Chapter 7 — Diffractometer Measurements." See also, "An Introduction to Crystallography" by F.C. Phillips, John Wiley & Sons, Inc., New York, New York.

It is to be understood that this invention is not limited to the examples herein shown and described, but that changes and modifications may be made without departing from the spirit and scope of the invention, as defined in the appended claims.

We claim:

1. A cationically-conductive, crystalline, composition of matter consisting essentially of the elements of oxygen, aluminum, sodium and a metal selected from the group consisting of lithium and magnesium and characterized by an X-ray diffraction powder pattern having as its major intensity peak between the angles of 50° and 60° a peak located intermediate the two major intensity peaks characteristic of the X-ray diffraction powder pattern of sodium beta-alumina between the angles of about 52° and about 56° when the X-ray wave length is about 1.7902 A and all said angles represent twice the angle of diffraction.

2. A cationically-conductive, crystalline, composition of matter consisting essentially of the elements of oxygen, aluminum, sodium and metal having a valence not greater than 2 in crystal lattice combination, being selected from the group consisting of cobalt, lithium, magnesium, nickel and zinc, and characterized by an x-ray diffraction powder pattern having an intensity peak at an angle of 53.5° – 54.5° when the X-ray wave length is about 1.7902A and said angle represents twice the angle of diffraction.

3. A cationically-conductive, crystalline article of manufacture consisting essentially of about 91 to about 95 weight percent structural lattice and about 5 to about 9 weight percent cations of sodium which are mobile in relation to said lattice under influence of an electric field, said lattice consisting essentially of ions of aluminum and oxygen and a minor proportion of ions of metal having a valence not greater than 2 in crystal lattice combination and selected from the group consisting of cobalt, lithium, magnesium, nickel and zinc, said minor proportion constituting about 0.08 to about 10 weight percent of said article.

4. An article of manufacture in accordance with claim 3 wherein said minor proportion constitutes between 0.086 and 9.08 weight percent of said article.

5. An article of manufacture in accordance with claim 3 wherein said ions of metal are lithium ions.

6. An article of manufacture in accordance with claim 3 wherein said ions of metal are magnesium ions.

7. An article of manufacture in accordance with claim 3 wherein said ions of metal are lithium ions and constitute about 0.08 to about 2.16 weight percent of said article.

8. An article of manufacture in accordance with claim 3 wherein said ions of metal are lithium ions and constitute about 0.33 to about 0.76 weight percent of said article.

9. An article of manufacture in accordance with claim 3 wherein said ions of metal are magnesium ions and constitute about 0.3 to about 9 weight percent of said article.

10. An article of manufacture in accordance with claim 3 wherein said ions of metal are magnesium ions and constitute about 0.38 to about 4.3 weight percent of said article.

11. An article of manufacture in accordance with claim 3 wherein said ions of metal are magnesium ions and constitute about 0.38 to about 2.3 weight percent of said article.

12. An article of manufacture in accordance with claim 3 wherein said article has a density in excess of 2.5.

13. An article of manufacture in accordance with claim 3 wherein said article has density in the range of about 2.7 to about 3.2.

14. An article of manufacture in accordance with claim 3 wherein said article has density in excess of about 3.

15. An article of manufacture comprising a cationically-conductive unitary object consisting essentially of sintered crystals, said crystals constituting essentially of about 91 to about 95 weight percent structural lattice and about 5 to about 9 weight percent sodium ions which migrate in relation to said lattice when a difference of electrical potential is provided on opposite sides thereof, said lattice consisting essentially of ions of aluminum and oxygen and a minor proportion of ions of metal having a valence not greater than 2 in crystal lattice combination, and selected from the group consisting of cobalt, lithium, magnesium, nickel and zinc, said minor proportion constituting about 0.08 to about 10 weight percent of said article.

16. An article of manufacture in accordance with claim 15 wherein said ions of metal are magnesium ions and constitute about 0.3 to about 9 weight percent of said article.

17. An article of manufacture in accordance with claim 15 wherein said ions of metal are magnesium ions and constitute about 0.38 to about 4.3 weight percent of said article.

18. An article of manufacture in accordance with claim 15 wherein said ions of metal are magnesium ions and constitute about 0.38 to about 2.3 weight percent of said article.

19. An article of manufacture in accordance with claim 15 wherein said ions of metal are lithium ions and constitute about 0.08 to about 2.16 weight percent of said article.

20. An article of manufacture in accordance with claim 15 wherein said ions of metal are lithium ions and constitute about 0.33 to about 0.76 weight percent of said article.

* * * * *